June 19, 1934.  J. H. HARLOW  1,963,788
PICTURE VIEWING APPARATUS
Filed Feb. 23, 1933   2 Sheets-Sheet 1
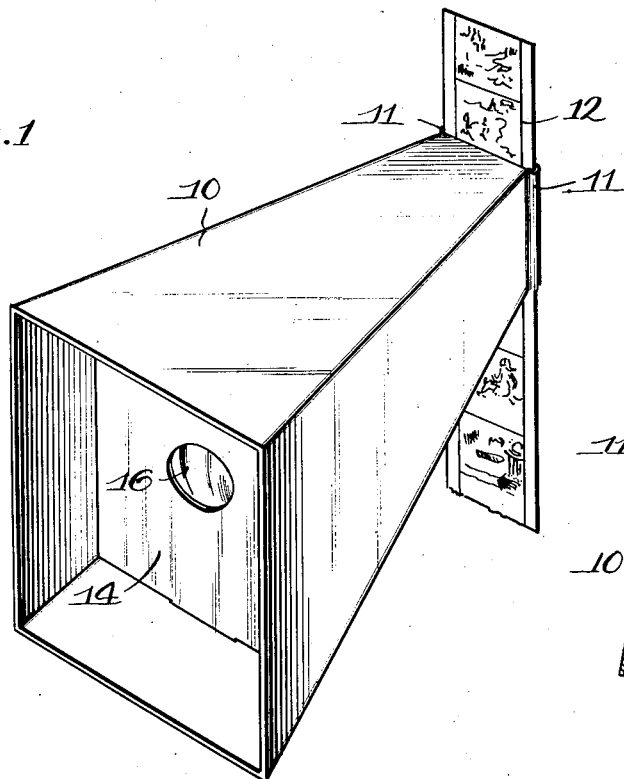
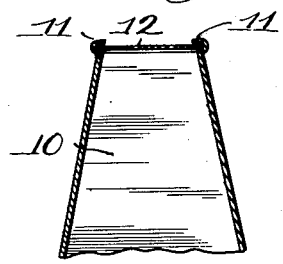
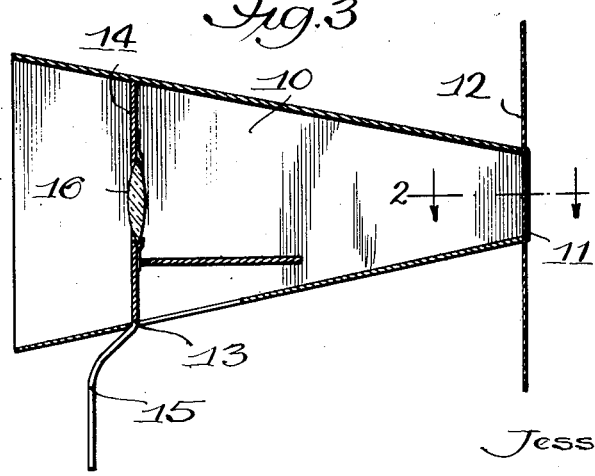
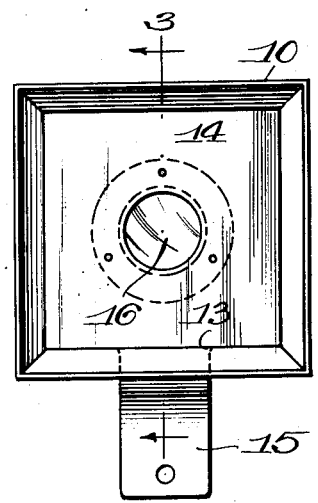
INVENTOR.
Jesse Hancock Harlow,
BY
ATTORNEY.
Witness:

Patented June 19, 1934

1,963,788

UNITED STATES PATENT OFFICE 1,963,788

PICTURE VIEWING APPARATUS

Jesse Hancock Harlow, Chicago, Ill.

Application February 23, 1933, Serial No. 657,985

3 Claims. (Cl. 88—29)

My present invention relates to improvements in picture viewing apparatus. A considerable business exists and has existed for a long time in connection with the preparation and distribution, in picture postcards and other forms, of interesting or attractive views characteristic of certain localities or other subjects.

It is also well known in the motion picture art to produce a number of views on a relatively small sheet of photographic film. The motion picture views are what are known as transparencies which have to be viewed by means of light transmitted through the view, which has the advantage of securing a picture of enhanced brilliancy and attractiveness, but motion picture views are upon such a reduced scale as to be unsatisfactory for viewing without magnification.

It is my purpose to provide upon a strip of film, similar to that employed in the making of motion pictures, a series of assorted, as distinguished from consecutive, views of a particular locality or subject-matter, and for the purpose of satisfactorily viewing such pictures I have provided the picture viewing apparatus hereinafter illustrated and described.

It is possible for some observers to comfortably employ a single eye in looking at pictures while others require apparatus permitting the use of both eyes for restful and satisfactory viewing. As will hereafter be seen my invention is possible of development in instruments affording both single and binocular vision.

My general objects have been to produce a simple picture viewing apparatus which may be made at slight expense and which will afford, with as little complication as possible, easy and satisfactory magnification and viewing of pictures upon such a small scale as to be unsuitable for such easy and satisfactory viewing with the unaided sight.

I have attained the foregoing objects by means of the structures illustrated in the accompanying drawings, in which—

Figure 5:
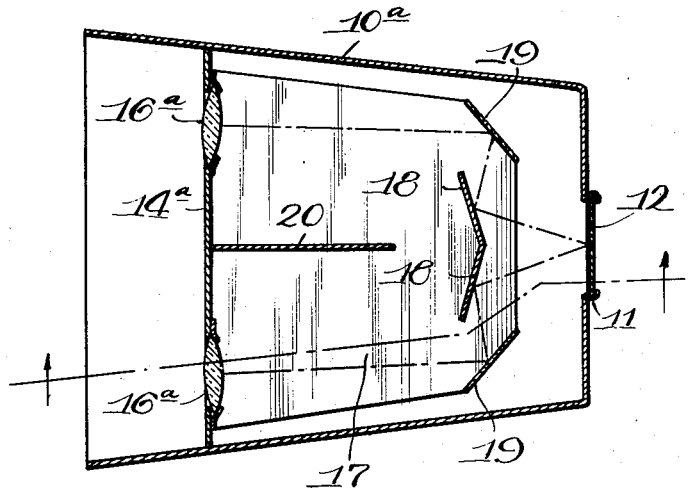
Figure 6:
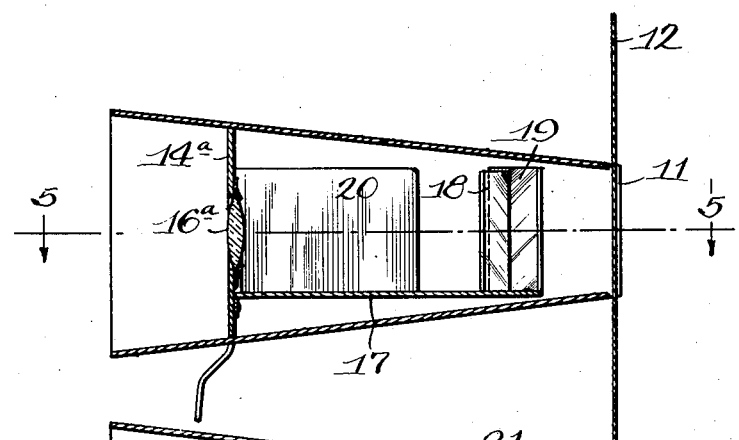
Figure 7:
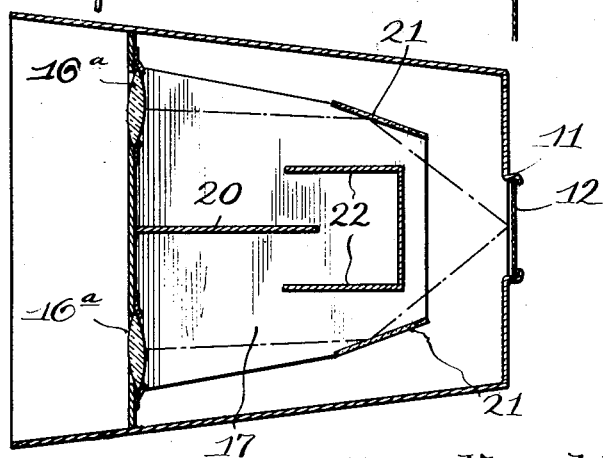

Fig. 1 is a perspective of a monocular picture viewing apparatus embodying my invention, Fig. 2 is a central, horizontal, fragmental section through the film carrying end of the structure shown in Fig. 1, Fig. 3 is a vertical, central, longitudinal section through the structure shown in Fig. 1 on line 3—3 of Fig. 4, Fig. 4 is an elevation looking into the hood end of the structure shown in Fig. 1, Fig. 5 is a horizontal, central section of a modification of the structure shown in Fig. 1 with an extra eye piece and mirrors arranged for securing binocular vision, Fig. 6 is a central, vertical section of the structure shown in Fig. 5, and Fig. 7 is a view similar to that shown in Fig. 5 showing a still further modified arrangement of mirrors for affording binocular vision.

Similar reference characters refer to similar parts throughout the respective views.

The body of the viewing apparatus comprises a truncated, four-sided hollow pyramid or prism 10, the side walls at the smaller end of which pyramid are extended and turned inwardly at 11 to form channels or guide ways for the edges of the film strip 12. In the bottom wall of the pyramid, a sufficient distance from the larger end or base to provide a satisfactory hood for excluding light, is a slot 13. Fitting and wedging into the interior of the pyramid at the plane of the slot 13 is a removable partition 14, the edges whereof are slightly beveled to correspond with the inclination of the inner surfaces of the walls of the pyramid 10. Integral with the partition 14 and extending through the slot 13 is a tongue or tang 15 extending toward the base and away from the pyramid 10. The tongue or tang 15 will be found to provide a satisfactory handle for the apparatus when in use and will also be found to materially aid in detachably securing the partition 14 within the pyramid 10. Figs. 1 and 4 show that the breadth of the tang 15 is such that the slot 13 must have a transverse disposition in the casing. There was no need to give the slot 13 the longitudinal extent indicated in Fig. 3. On the other hand, such a longitudinal extent as indicated in Fig. 3 does not in any way interfere with the function of the apparatus as the opening is below the platform which prevents any light entering the opening from reaching the lens or the picture. In the center of the partition 14 is provided an aperture of sufficient extent to mount the lens 16 therein or adjacent thereto. This comprises all of the structure which is necessary in a monocular picture viewing apparatus in an extremely desirable form because after the degree of magnification desired is determined upon and a suitable strength of lens is provided for securing such magnification no focusing adjustment is required. Also this device shields the eye by reason of the hood from light proceeding from other directions than through the picture which is being viewed. The above described arrangement permits of the easy and economical mounting of the lens and by providing a number of interchangeable partitions with lenses of different magnification the purchaser is afforded a selection as to magnification in accordance with his particular wishes or desire.

The instruments for securing binocular vision, as illustrated in Figs. 5 to 7 inclusive, are very little more complicated than the monocular apparatus. In the binocular apparatus the pyramidal body 10a is the same except in dimensions and the removable partition 14a is also the same except instead of having a single lens it is provided with a pair of spaced lenses 16a. The removable partition 14a of the binocular viewing apparatus has mounted thereon, below the plane of the lenses, a platform 17 upon which is mounted additional optical equipment required for securing binocular vision. In Fig. 5 this additional optical equipment consists of a pair of mirrors or reflectors 18—18 set at opposite angles with the plane of the film 12. There are also an additional pair of mirrors or reflectors 19—19 set at the requisite angle with respect to the reflectors 18—18 so as to reflect the image of the view received from the reflectors 18—18 to the lenses 16a. This apparatus employs the midget or 18 mm. film so that actually the mirrors would not extend above the section line 5—5 of Fig. 6.

I have also provided the central, longitudinal, vertical screen 20 extending between the removable partition 14a and the platform 17 to prevent the diffusion of light across the apparatus.

In the modified form of binocular apparatus illustrated in Fig. 7 I employ a single pair of mirrors or reflectors 21—21 which reflect directly the image from the film 12 to the lenses 16a—16a. In this latter arrangement for binocular vision, besides the screen 20, I also provide the screen or screens 22 at the forward end of the platform 17 for preventing the passage of any light, except by reflection, from the film to the lenses. The arrangement of the entire optical equipment in both monocular and binocular forms of apparatus upon the removable partition 14 or upon the removable partition 14a and platform 17 much simplifies the installation of such equipment and secures important economies in the construction of the apparatus. These apparatuses will permit the magnification and viewing of even the smallest size of motion picture views with ease and comfort and pleasure. Also, such an apparatus will permit the use of a large number of interesting and beautiful views in a form requiring very little space which will vastly extend the field for use and pleasure with such an apparatus.

Having described my invention what I claim as new and desire to secure by Letters Patent is:

1. A picture viewing apparatus comprising a truncated, hollow, pyramidal casing, means provided at one end thereof for slidably receiving and holding a picture film, said casing having a slot transversely of one wall thereof, a partition frictionally mounted within said casing in the plane of said slot, a tang carried by said partition and extending through said slot, and optical elements for viewing the picture on said film carried by said partition.

2. A picture viewing apparatus comprising an elongated, hollow casing, means for slidably holding a picture film at one end thereof, a partition removably mounted within and spaced from the viewing end of said casing, a platform carried by said partition, focalizing elements for viewing the picture on said film mounted upon and carried by said partition, and reflectors carried by said platform for reflecting the picture on said film to said respective focalizing elements.

3. A picture viewing apparatus comprising an elongated, hollow casing, means for slidably holding a picture film at one end thereof, a partition removably mounted within and spaced from the viewing end of said casing, a platform carried by said partition and optical elements for viewing the picture on said film mounted upon and carried by said partition and platform comprising magnifying elements mounted in said partition and reflecting elements mounted upon said platform which reflect the picture on said film to said respective magnifying elements whereby an illusion of parallax is produced.

JESSE HANCOCK HARLOW.